United States Patent [19]
Harris et al.

[11] Patent Number: 5,314,134
[45] Date of Patent: May 24, 1994

[54] ANTI-CLOCKSPRINGING CASSETTE FOR A ROLL OF WEB MATERIAL AND METHOD

[75] Inventors: Clark E. Harris; Joel R. Shaw, both of Fairport; Thomas C. Healey; Mark J. Morse, both of Rochester, all of N.Y.

[73] Assignee: Eastman Kodak Company, Rochester, N.Y.

[21] Appl. No.: 979,515

[22] Filed: Nov. 19, 1992

[51] Int. Cl.⁵ .................. B65H 75/18; B65D 85/60
[52] U.S. Cl. .................. 242/71.1; 242/72.1; 242/75.4; 354/275
[58] Field of Search .............. 242/71.1, 75.4, 68.4, 242/72.1, 197, 72 R; 354/275; 206/407

[56] References Cited

U.S. PATENT DOCUMENTS

| | | | |
|---|---|---|---|
| 3,613,876 | 10/1971 | Kohler et al. | 242/71.1 X |
| 3,784,001 | 1/1974 | Bushnell et al. | 242/71.1 |
| 3,831,881 | 8/1974 | Tucker | 242/194 |
| 4,033,523 | 7/1977 | Roman | 242/198 |
| 4,398,814 | 8/1983 | Muylle et al. | 354/275 |
| 4,802,633 | 2/1989 | Beery | 242/71.1 |
| 4,830,305 | 5/1989 | Giiggi et al. | 242/71.7 |
| 4,903,833 | 2/1990 | Beery | 206/407 |

Primary Examiner—Daniel P. Stodola
Assistant Examiner—John F. Rollins
Attorney, Agent, or Firm—Clyde E. Bailey

[57] ABSTRACT

A light-tight cassette (10) has an anti-clockspringing method for preventing clockspringing of a wound roll of web material (14) within the cassette (10) during storage and shipment. The web material (14) is mounted on a tubular web core (12) arranged to rotate about an axis within the cassette (10). Cassette (10) has at least one end cap (22) having a tubularly shaped hub member (34). Hub member (34) has a diametrically extending bar (38) for receiving an anti-clockspring means comprising a fork (44) having a central member (52) comprising spaced anti-rotation arms (42,44) for receiving bar (38). Fork (44), moreover, comprises at least one flexible latch finger (46) that latchingly engages the end cap (22) and a flexible lock finger (48) that is wedged between and into an annular gap formed when the hub member (20) is inserted into the web core (12) for locking the web core (12) against rotation.

8 Claims, 4 Drawing Sheets

ANTI-CLOCKSPRINGING CASSETTE FOR A ROLL OF WEB MATERIAL AND METHOD

FIELD OF THE INVENTION

The present invention relates generally to a cassette for holding and dispensing a roll of unexposed light sensitive web material and, a method of preventing clockspringing of a wound roll of web material within a cassette.

BACKGROUND OF THE INVENTION

It is generally known in the art to provide a web cassette for holding and dispensing a roll of unexposed light-sensitive web material for use in phototypesetting apparatus, in semi-automatic process cameras, for instance, for handling diffusion transfer material in a daylight environment, etc. In such web cassettes, the end caps have peripheral slots for receiving side edges of the cassette jacket, and are secured in light-tight relation to the side edges by adhesive and/or staples. Accordingly, a shortcoming of the prior art web cassettes is that the assembly steps of applying the adhesive to the side edges of the jacket and stapling together the mating edges of the end caps and jacket side edges add to the cost of manufacturing the web cassettes.

One prior art attempt to solve the aforementioned problem includes U.S. Pat. No. 4,903,833 which teaches a cartridge for light sensitive web-type material having inwardly extending annular rings in the housing ends which terminate in close running relation to the adjacent outside surface of a spool end flange to support the media material and to prevent telescoping in the event the cartridge or cassette is mishandled or dropped. While the cartridge therein disclosed may have sufficed for its intended purpose, it does not fulfill the present need set forth hereinabove.

Moreover, in various cassettes now in use for webs of photosensitive film and paper, the web is wound on a spool or core, with or without flanges, and is disposed within a cassette which totally surrounds the web and protects it from light and other damaging effects. One end of the web is normally secured to the core or spool center, and the other end extends out of the cassette through an exit slot therein. The other end of the web is fastened to the surface of the cassette, and is released therefrom for insertion into a camera or the like. It has been found that there is a tendency for the web in such cassettes to unwind during handling and shipping. Inasmuch as the inner end of the web is connected to the core or the spool center, and the other end is normally secured to the outer surface of the cassette, the web acts as a released clockspring, turning the spool as it unwinds. Such web clockspringing can result in scratching of the surface of adjacent web convolutions, causing a deterioration in the quality of the image that may be recorded thereon. In other instances the web can clockspring outwardly to the extent that the outer convolution of web jams against the inner surface of the cassette, making subsequent unreeling of the web difficult or impossible. In those situations in which the outer end of the web is not fastened to the surface of the cassette or is inadvertently released from the cassette surface, the clockspringing can cause the outer end of the web to be pulled back through the slot into the cassette, resulting in a cartridge that is completely unusable.

Various attempts have been made to provide a method of preventing clockspringing, i.e, unwinding of the web in cassettes. For example, one such method using a core locking device for a web dispensing cassette is disclosed and published as Item No. 16352 in the November 1977 issue of Research Disclosure. In this core-locking device, the web winding core is provided with a slotted end, and a core-locking member is provided that is captive and slidable in one of the two end caps of the cassette. In U.S. Pat. No. 3,831,881, an anti-backup device is disclosed comprising a fork-like member located within a hollow core on a rotatable film take-up core. The control member has flexible outwardly extending arms projecting from a body portion. In an engaged position of the control member, the arms thereof slide over internal cam or ratchet surfaces of the take-up core during rotation of the core in the forward (take-up) direction, and hence permits such rotation. On the other hand, these arms engage the cam or ratchet surfaces of the core post to block rotation of the core when an attempt is made to rotate the core in the reverse (unwinding) direction. When the film cartridge is placed within a camera, the fork-like member can be moved axially until it is out of engagement with the camera ratchet surfaces, thereby permitting free rotation of the core in both the forward and reverse directions. In U.S. Pat. No. 4,756,418, an anticlockspringing apparatus is disclosed comprising a clip separate from the core and cassette, having opposite ends thereof insertable through aligned notches and slots in the core and cassette respectively, for locking the core to the cassette.

Therefore a need exists for a light tight web cassette that is easy to assemble and economical to manufacture and, an improved anti-clockspring method for preventing unwinding of the web in the cassette thereby reducing incidences of damaged cartridges.

SUMMARY OF THE INVENTION

It is therefore an object of the present invention is to provide an improved light-tight web cassette for holding and dispensing a roll of photosensitive web material.

Another object of the present invention is to provide an anti-clockspringing device for a web cassette that is of simple design and construction, thoroughly efficient and reliable in operation, and economical to manufacture.

Accordingly, for solving the aforementioned problems, there is provided in one embodiment of the invention, a cassette for holding and dispensing a roll of photosensitive web material, the cassette comprising:

a web core rotatable about an axis and having an inner peripheral surface defining a core opening; at least one end cap having a tubularly shaped hub member insertable into the web core opening for rotatably supporting the web core, hub member having an outer peripheral surface radially spaced from the inner peripheral surface of web core to form an annular gap therebetween;

a jacket encircling the web core and supported by the end caps; and anti-clockspringing means on the cassette for securing web core against rotation during shipping and handling, and for releasing the web core 12 for rotation in a forward direction during web transport from cassette, the anti-clockspringing means comprising:

a fork slidably mounted within at least one hub member, each fork having at least one latch finger at one end, and at least one lock finger at the opposite end, fork being further slidably movable between a core-locked position in which the latch finger latchingly engages the end cap and the lock finger is wedged into the annular gap between hub member and web core for locking web core from rotation, and a core-released position in which latch finger is disengage from the end cap and the lock finger is disengaged from the annular gap for allowing web core rotation.

Moreover, for accomplishing the objects of the invention, there is provided in another embodiment of the invention, a method for preventing clockspringing of a wound roll of web material within a cassette during storage and shipment, in which the roll of web material is wound on a central tubular core having an inner peripheral surface defining a core opening, a pair of cassette end caps having central tubular hub members insertable into the core opening for rotatably supporting the core, each hub member having an outer peripheral surface radially spaced from the inner peripheral surface of the core to form an annular gap therebetween, comprising the steps of:

slidably mounting wedging means within at least one of the tubular hub members having a flexible web arm in sliding engagement with the inner peripheral surface of the core for movement between core-locked and core-released positions; and slidably moving the wedging means between the core-locked position in which the wedge arm is forced into the annular gap into locking engagement with the inner peripheral surface of the core and outer peripheral surface of the hub member to prevent core rotation and clockspringing of the roll of web material, and the core-released position in which the wedge arm is withdrawn from the annular gap to allow rotation of the core and roll of web material.

BRIEF DESCRIPTION OF THE DRAWINGS

In the detailed description of the invention presented below, reference is made to the accompanying drawings, in which.

DETAILED DESCRIPTION OF THE DRAWINGS

Figure 1:
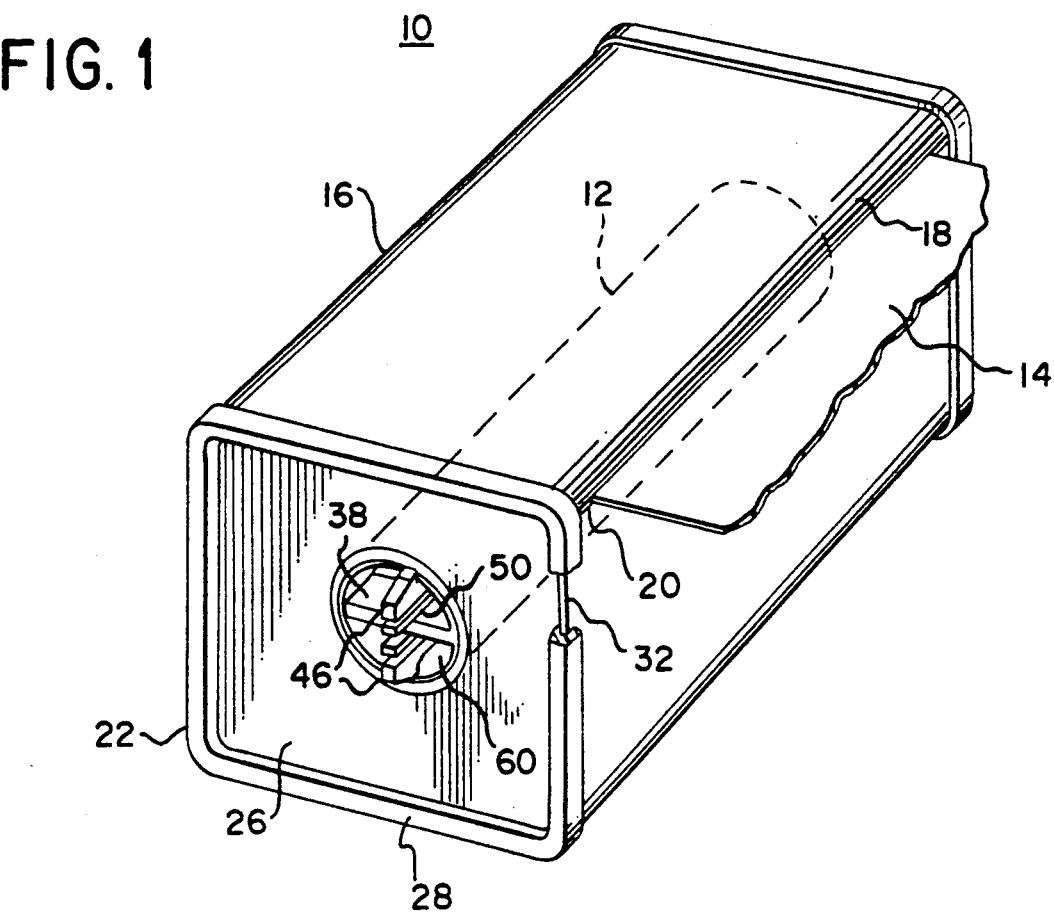
FIG. 1 is a perspective view of a web cassette according to the principals of the invention.
Figure 5:
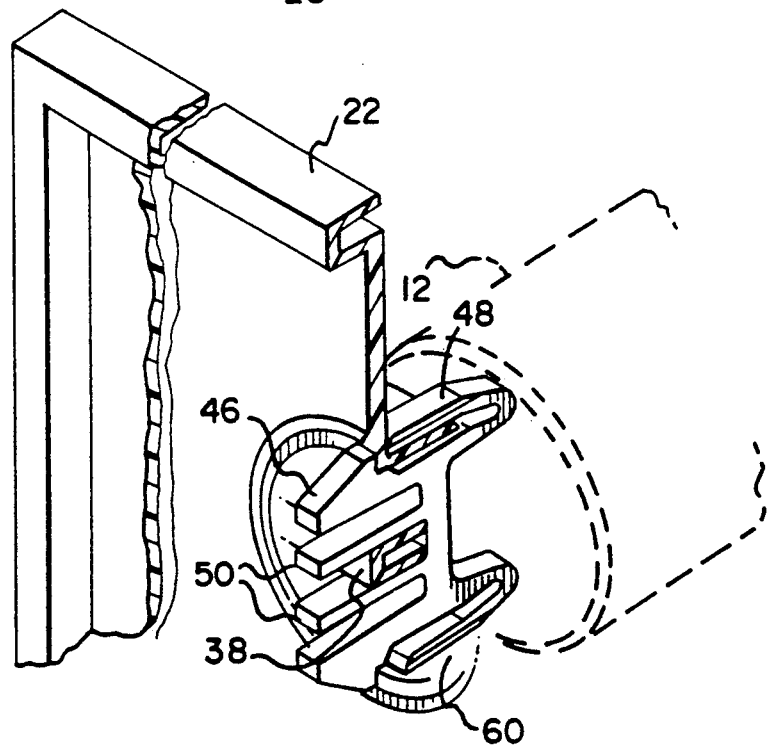
FIG. 5 is a fragmentary perspective view of the end cap.
Figure 2:
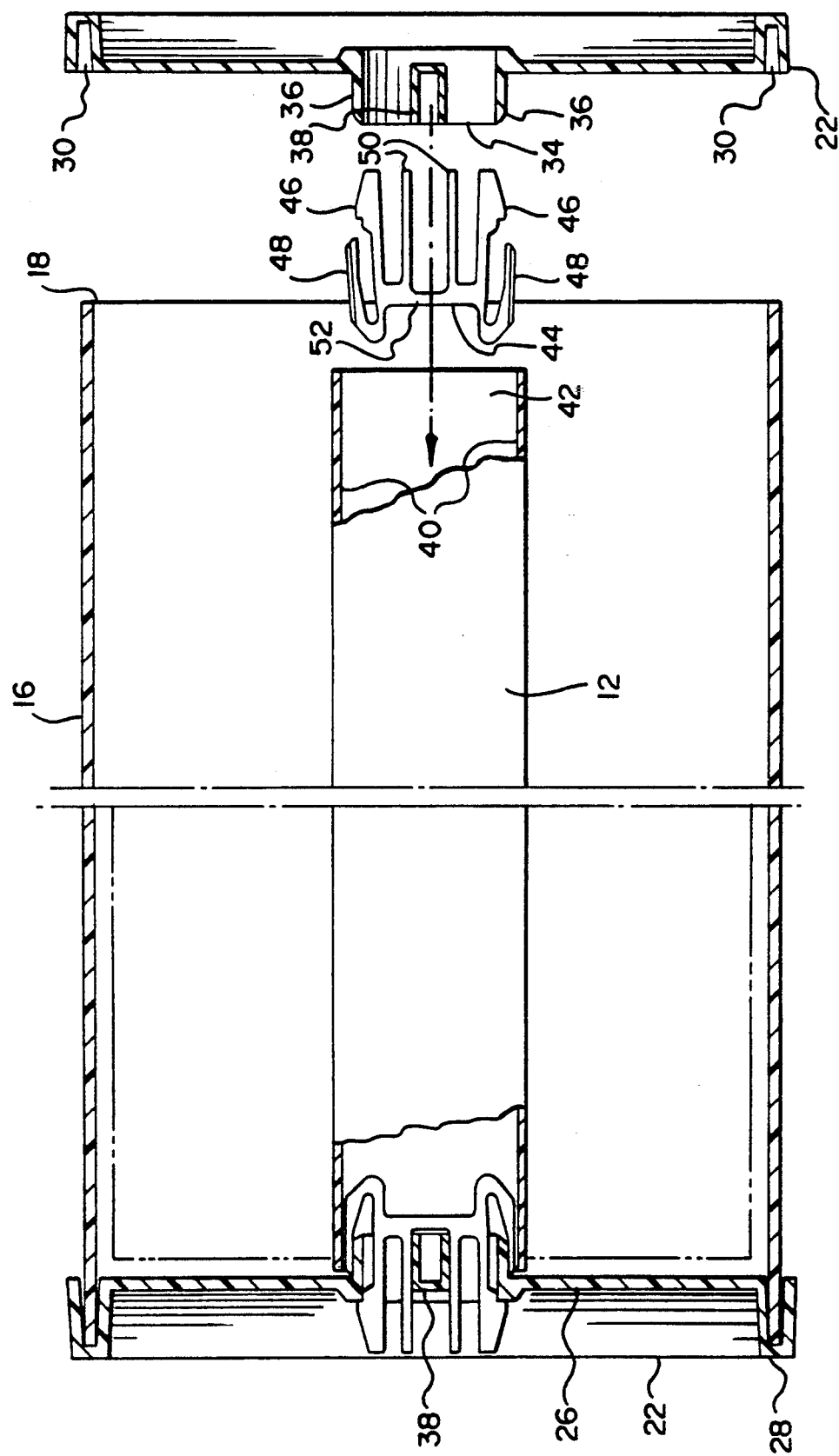
FIG. 2 is a vertical section view according to the plane indicated by the 2—2 line of FIG. 1 and further showing one end portion of the cassette exploded.

With reference to FIGS. 1 and 2, a preferred embodiment of a web cassette 10 of this invention comprises a substantially tubular core 12, onto which is wound web material 14 to form a web roll. The web roll is surrounded by any means within the requirements of the invention; preferably, the web roll is housed within a substantially rectangular jacket 16 having side edges 18. Jacket 16 has a peripheral web exit slot 20 extending substantially from one side edge 18 thereof to the other, through which the web material 14 may be drawn from cassette 10.

In the preferred embodiment of the invention, the web cassette 10 is provided with a pair of substantially identical end caps 22 which support jacket 16. A plurality of strengthening ribs 24 (FIG. 1) radially extends from inner wall 26 (FIG. 2) of end caps 22 to outer wall 28 of end caps 22. Each end cap 22 has a peripheral recess 30 for receiving an end edge 32 of jacket 16, as best seen in FIG. 2. Moreover, each end cap 22 has a tubular hub member 34 having an outer peripheral ramp 36, and a diametrically extending bar 38 for cooperatively engaging the anti-clockspringing mechanism of the invention.

Web core 12 has a sleeve portion 40 defining a core opening 42 which engages outer peripheral ramp 36 of hub member 34 (FIG. 2). Sleeve portion 40 acts as a light lock and a bearing surface during web roll rotation while in contact with outer peripheral ramp 36 of hub member 34.

Figure 3:
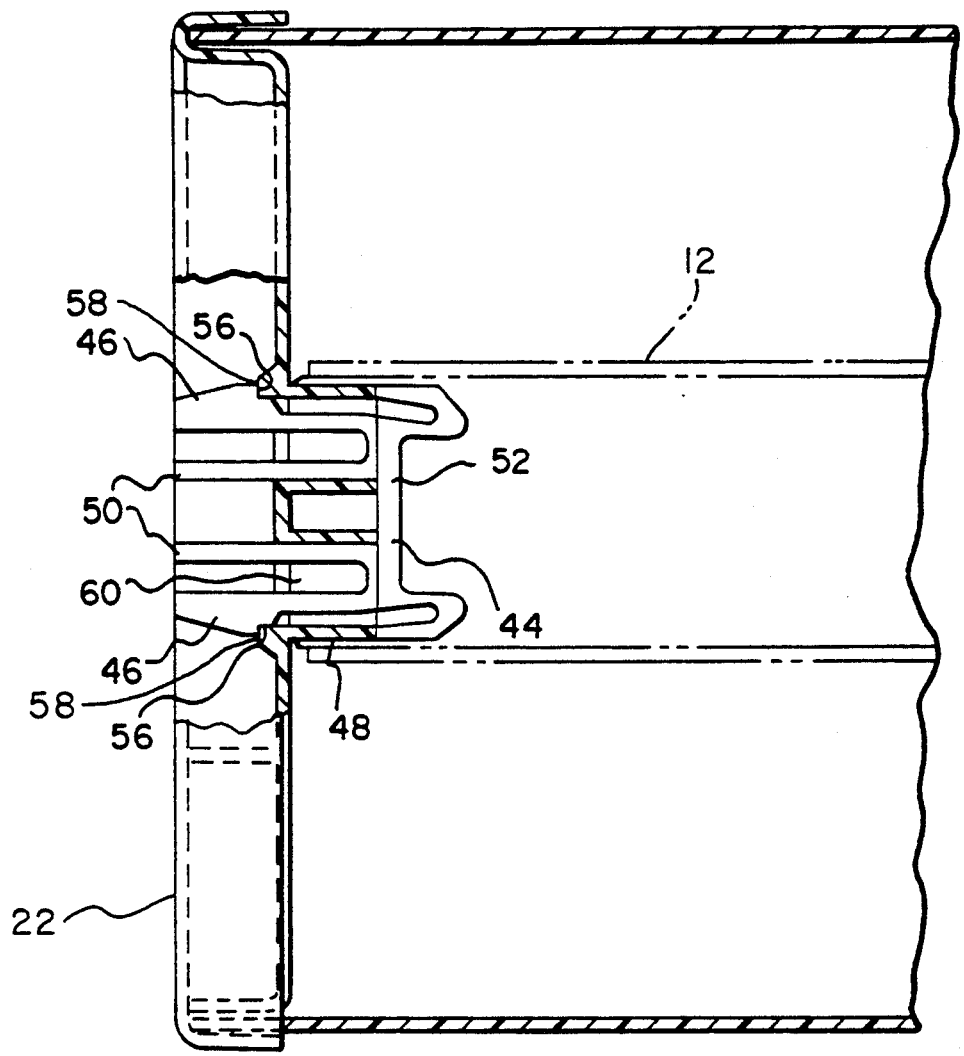
FIG. 3 is an elevated end view of the anticlockspringing mechanism in a locked position.
Figure 4:
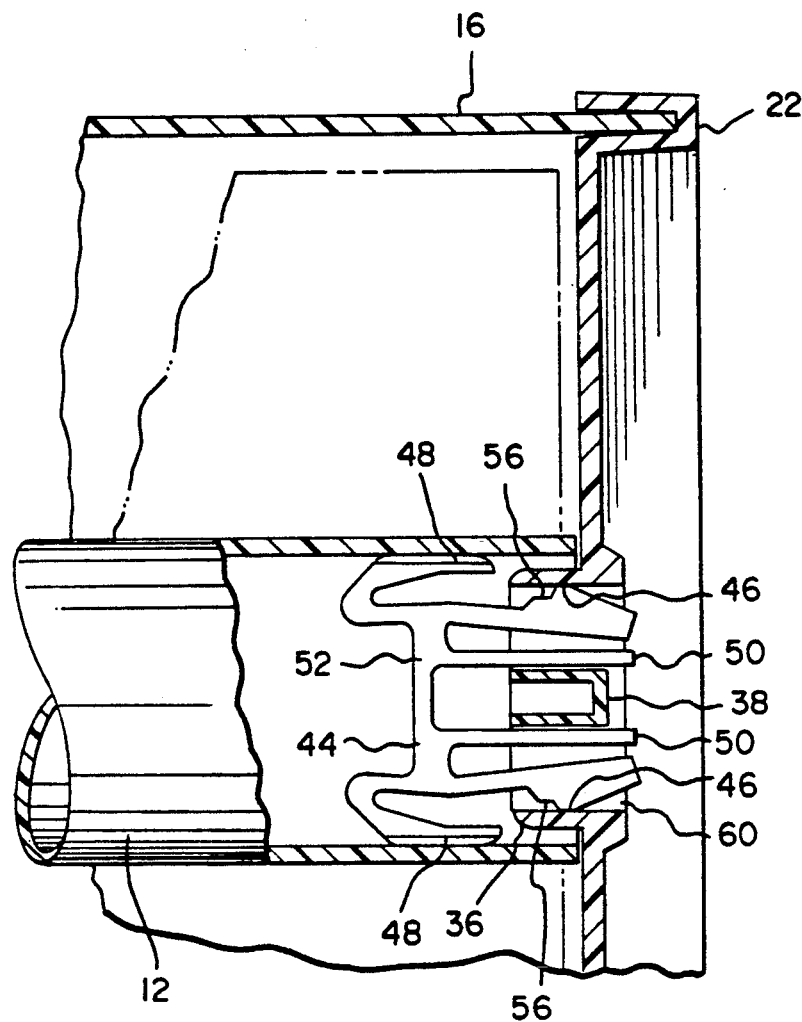
FIG. 4 is an elevated end view of the anticlockspring mechanism in an unlocked position.
Figure 6:
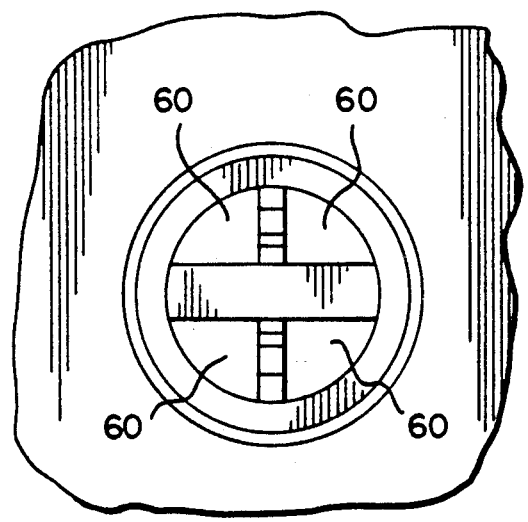
FIG. 6 is a partial section view of the end cap.

Turning to FIGS. 2, 3, 4, and 5, the anti-clockspringing mechanism of the invention is shown comprising fork 44 having at least one flexible latch finger 46 and flexible lock finger 48, and anti-rotation arms 50. While there are numerous ways to prevent the rotation of end caps 22 relative to web core 12, in the preferred embodiment, a substantially flat fork 44 comprising a pair of spaced-apart flexible central member 52 and a pair of flexible lock fingers 48 extending from the opposite end of central member 52 toward hub member 34 is preferred. While fork 44 is in its locked position, (FIG. 3), the flexible lock fingers 48 are wedged between web core 12 and peripheral ramp 36 of hub member 34, thereby preventing rotation between end caps 22 and web core 12. The inventors prefer a web core 12 comprised of a soft penetrable cardboard material. Fork 44 is retained from pushing inward towards the center of web core 12 through its core opening 42 by flexible latch fingers 46 engaging notches 56 on flexible latch finger 46 with shoulder 58 of end cap 22 (FIG. 3). When flexible latch fingers 46 are pinched together and fork 44 is pushed inward, fork 44 slides axially toward the center of web core 12 disappearing into the center opening 60 of end cap 22, thereby releasing web core 12 and allowing rotation between web core 12 and end cap 22 when web material 14 is dispensed.

Accordingly, an important advantage of the web cassette 10 having an anti-clockspringing mechanism as defined by the present invention is that it can easily be assembled, provides minimum changes to the present cartridge design, and is highly visible as well as functionally easy to understand.

The invention has been described in detail with particular reference to various embodiments thereof, but it will be understood that variations and modifications can be effected within the spirit and scope of the invention.

What is claimed is:

1. A cassette for holding and dispensing a roll of photosensitive web material, said cassette comprising:
   a web core rotatable about an axis and having an inner peripheral surface defining a core opening;
   at least one end cap having a tubularly shaped hub member insertable into said core opening for rotatably supporting said web core, said hub member having an outer peripheral ramp radially spaced from said inner peripheral surface of said web core to form an annular gap therebetween;
   a jacket encasing said web core and supported by said end caps; and, anti-clockspringing means for securing said web core against rotation during shipping and handling, and for releasing said web core for rotation in a forward direction during web transport from said cassette, the anti-clockspringing means comprising:

a fork slidably mounted within at least one hub member each fork having at least one latch finger at one end, and at least one lock finger at the opposite end, said fork being further slidably movable between a core-locked position in which said latch finger latchingly engages said end cap and said lock finger is wedged into said annular gap between said hub member and said web core for locking web core from rotation, and a core-released position in which said latch finger is disengaged from said end cap and said lock finger is disengaged from said annular gap for allowing web core rotation.

2. The cassette recited in claim 1 wherein each said hub member has a diametrically extending bar, and wherein each fork comprises a central member having spaced apart arms for receiving said bar and slidably guiding said fork between its core-locked and core-released position thereby preventing rotation of said fork and said end cap.

3. The cassette recited in claim 2 wherein each said lock finger has a reversed end portion extending substantially axially toward the hub member for movement into said annular gap upon movement of said fork to its core-locked position.

4. The cassette recited in claim 3 wherein said lock finger is flexible and biased radially inwardly, away from the core.

5. The cassette recited in claim 1 wherein said web core comprises a soft penetrable cardboard material.

6. A method for preventing clockspringing of a wound roll of web material within a cassette during storage and shipment, in which the roll of web material is wound on a central tubular core having an inner peripheral ramped surface defining a core opening, a pair of cassette end caps having central tubular hub members insertable into the core opening for rotatably supporting the core, each hub member having an outer peripheral surface radially spaced from the inner peripheral surface of the core to form an annular gap therebetween, comprising the steps of:

slidably mounting wedging means within at least one of the tubular hub members, said wedging means having a flexible web arm in sliding engagement with the inner peripheral surface of the core for movement between core-locked and core-released positions; and slidably moving the wedging means between the core-locked position in which the wedge arm is forced into the annular gap into locking engagement with the inner peripheral surface of the core and outer peripheral surface of the hub member to prevent core rotation and clockspringing of the roll of web material, and the core-released position in which the lock finger is withdrawn from the annular gap to allow rotation of the core and roll of web material.

7. A method according to claim 6 wherein the hub members and core are formed of substantially rigid materials, the wedge means comprises a plate-like fork onto which the flexible lock finger is mounted, the lock finger having a wedge head formed of substantially rigid material at the free end thereof, whereby the wedge head is forced into the gap between the hub member ramp and core in the core-locked position, and withdrawn therefrom in the core-released position.

8. A method according to claim 6 wherein the flexible lock finger is reverse mounted to extend toward the hub member.

* * * * *